(12) United States Patent
Rosenberg et al.

(10) Patent No.: US 9,784,953 B2
(45) Date of Patent: Oct. 10, 2017

(54) DEVICE FOR OPTICALLY COUPLING PHOTONIC ELEMENTS

(75) Inventors: Paul Kessler Rosenberg, Sunnyvale, CA (US); Michael Renne Ty Tan, Menlo Park, CA (US); Huei Pei Kuo, Cupertino, CA (US); Robert G Walmsley, Palo Alto, CA (US); Eric Peterson, McKinney, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 860 days.

(21) Appl. No.: 13/126,848

(22) PCT Filed: Oct. 31, 2008

(86) PCT No.: PCT/US2008/082143
§ 371 (c)(1),
(2), (4) Date: Jul. 19, 2011

(87) PCT Pub. No.: WO2010/050981
PCT Pub. Date: May 6, 2010

(65) Prior Publication Data
US 2011/0268392 A1    Nov. 3, 2011

(51) Int. Cl.
*G02B 13/22*    (2006.01)
*G02B 7/00*    (2006.01)
*H04B 10/80*    (2013.01)

(52) U.S. Cl.
CPC ............. *G02B 13/22* (2013.01); *G02B 7/003* (2013.01); *H04B 10/803* (2013.01)

(58) Field of Classification Search
CPC ................................ G02B 7/003; G02B 13/22
See application file for complete search history.

(56) References Cited

U.S. PATENT DOCUMENTS 4,641,915 A * 2/1987 Asakawa et al. ............... 385/26
4,753,510 A * 6/1988 Sezerman ....................... 385/61
(Continued)

FOREIGN PATENT DOCUMENTS

EP    0237237    9/1987
FR    2607346    5/1988
(Continued)

OTHER PUBLICATIONS

Supplementary European Search Report, Nov. 28, 2012, Application No. EP 08877896 (filed May 13, 2011).

*Primary Examiner* — Omar R Rojas
(74) *Attorney, Agent, or Firm* — Hewlett Packard Enterprise Development LP (57) ABSTRACT

A device for optically coupling two photonic elements may comprise an interposer where each photonic element is axially aligned with an optical pathway in the interposer. Also included is an optics assembly configured to direct a photonic signal along the optical pathway; and a mechanical guide assembly configured to reduce the relative tilt and rotation of photonic elements. Another such device may comprise two connectors where each connector comprises an optical pathway element in which an optics assembly is situated and a photonic element aligned with the optical pathway element. A mechanical guide assembly secures the optical pathway elements in a position so as to reduce the relative tilt and rotation of the photonic elements. A connection for optically coupling two computing units can comprise a partition situated between the computing units and on which an interposer is mounted.

18 Claims, 10 Drawing Sheets

(56) References Cited

U.S. PATENT DOCUMENTS

| | | | |
|---|---|---|---|
| 5,093,879 A | | 3/1992 | Bregman et al. |
| 5,362,961 A | * | 11/1994 | Hamanaka .................... 250/216 |
| 5,568,578 A | * | 10/1996 | Ames .............................. 385/34 |
| 6,819,813 B2 | | 11/2004 | Howland et al. |
| 7,015,454 B2 | * | 3/2006 | Stone ........................... 250/216 |
| 7,251,388 B2 | | 7/2007 | Morris et al. |
| 7,369,726 B2 | | 5/2008 | Drost et al. |
| 7,428,110 B2 | * | 9/2008 | Tamada et al. ............... 359/811 |
| 2002/0054410 A1 | | 5/2002 | Ishikawa et al. |
| 2004/0159777 A1 | | 8/2004 | Stone |

FOREIGN PATENT DOCUMENTS

| | | |
|---|---|---|
| JP | 1988-015075 U | 2/1988 |
| JP | 1989-102876 | 4/1989 |
| JP | 05-040214 A | 2/1993 |
| JP | 1997-044272 | 2/1997 |
| JP | 1999-109169 | 4/1999 |
| JP | 2001-196625 | 7/2001 |

* cited by examiner

DEVICE FOR OPTICALLY COUPLING PHOTONIC ELEMENTS

BACKGROUND

Optical communication between computing units provides a number of advantages relative to electrical signaling, including increased speed and bandwidth. Such connections often involve using optical fibers or other waveguides. Typically, communication between adjacent printed circuit boards (PCBs) or blades in a computer rack flow along the length of a blade, through a connector into the backplane, through another connector into a switch, and back through a similar path to a destination on the second blade. This process can be relatively slow and require significant electrical power to drive the metal traces and connector pins. Signal integrity and power usage improve through the use of optical communications.

In order to establish more efficient communication between pairs of optical fibers or waveguides, it is valuable to bring the optical channels that transmit light into relatively precise co-axial alignment. For example, single mode optical fibers minimize loss of optical power with an alignment precision of approximately one micron. Multi-mode fibers minimize loss of optical power with an alignment precision within a few microns. It can be difficult to achieve this level of alignment precision between mating assemblies. It is therefore desirable to reduce the needed precision, and to lessen the complexity of the parts and processes used for connecting optical channels.

DETAILED DESCRIPTION OF EXAMPLE EMBODIMENTS

Reference will now be made to the exemplary embodiments illustrated, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Optical-electrical (OE) or electro-optical (EO) interconnects are used to connect PCBs and circuits on the PCBs together. Manually attaching OE interconnects may be time consuming and require bulky and expensive electrical or optical cabling. It may also be the case that the optical elements that are to be brought into alignment are positioned such that it is not possible to manually attach optical fibers. This is the case in server type computers, where tight spacing between blade assemblies prevents the insertion of a hand or even a thin tool.

Computer manufacturers desire ways to connect computing units such as printed circuit boards (i.e. blades) in a computer rack, while reaping the benefits of optical data transfer in network systems and addressing the difficulties attendant to the need for high precision in such connections. Accordingly, devices and systems can be provided for optically connecting PCBs in which photonic elements are aligned to preserve data signal strength and fidelity.

A device for optically coupling photonic elements can include an interposer situated between the elements. For purposes of description, this discussion will refer to photonic elements that are typically associated with signals between PCBs such as server blades. However, the application of the devices discussed is also relevant to connecting other types of computing units or other devices that send or receive photonic signals.

Server blades are generally contained within sheet metal enclosures. These enclosures typically are open on the front and back ends in order to allow penetration of electrical connectors into the back and attachment of peripheral devices such as disc drives into the front. The enclosures are typically closed on the other four sides. Optical data signals may be carried by waveguides between the outside of the blade enclosure and the PCB inside. The waveguide may be one or more hollow core metal waveguides, optical fibers, or a polymer waveguide containing one or more optical cores. In one example, there may be two OE components involved, e.g. a transmitter optical subassembly (TOSA) on a left blade transmitting to a receiver optical assembly (ROSA) on a blade on a right side. Connected to the TOSA is a fiber ribbon carrying multiple parallel optical signals to a terminal block that penetrates the blade enclosure. A similar fiber ribbon connected to the ROSA terminates in a terminal block that penetrates the ROSA blade enclosure. In order to transmit optical signals from the TOSA to the ROSA it is advantageous to precisely align the terminal block units so that their respective optical fibers are coaxially aligned. One way is to simply place the two terminal blocks opposite one another across an open space. However, it is clear that in such an arrangement there will often be slight differences in the relative alignment of the terminal blocks around one or more spatial axes.

Misalignment between the photonic elements of two blades can result in a marked loss of signal during transmission. As used herein, "photonic element" refers to an element configured to transmit or receive light-based signals, and can be a singular element or an array of such elements. A photonic element may be an optical transmitter (e.g. a laser) or receiver (e.g. a photodiode), or it may be an external access point to such elements (e.g. the terminal end of a waveguide).

Figure 1:
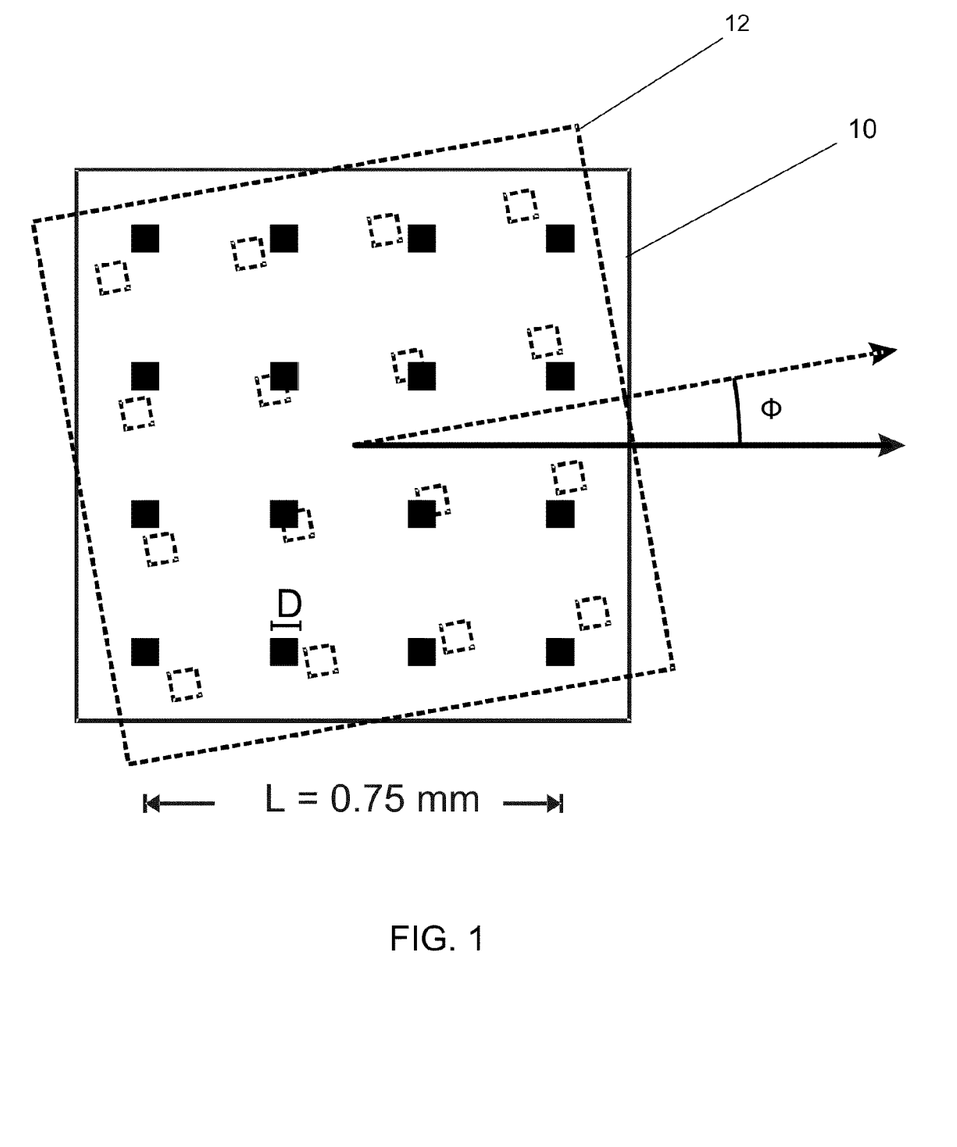
FIG. 1 is a representation of rotational misalignment Φ between an array of transmitting photonic elements and an array of receiving photonic elements.
Figure 2:
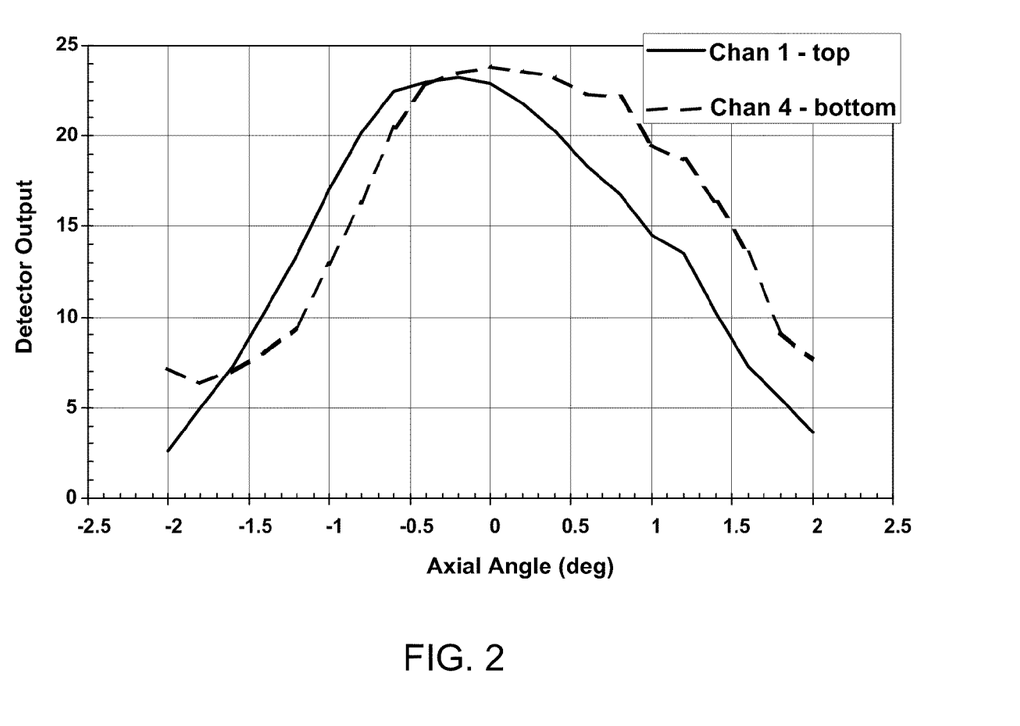
FIG. 2. is a graph of the relationship between the degree of rotational misalignment between two photonic elements and the integrity of a signal transmitted between the elements.

FIG. 1 shows a representation of a 4×4 transmitting array 10 (depicted in solid lines) and a corresponding receiving array 12 (dotted lines). In this example, the receiving array is rotated by an angle Φ relative to the transmitting array. This angle of rotation results in a signal loss that increases rapidly with Φ. This relationship is illustrated in the graph of FIG. 2 showing the output of two detector channels in such an array with changing angle of rotation. It can be seen therefore that such connections tend to be quite intolerant of rotational misalignment. The tolerance in Φ is linearly proportional to the maximum linear dimensions of the detector array (as illustrated in FIG. 1), i.e., the active area diameter D and array length L. As such, the degree of shift that will result in an unacceptable signal loss for a given application will depend on the dimensions of the photonic elements involved. In the illustrated case, to keep the signal loss due to rotation to less than 1 dB, Φ should be less than about 1°.

Figure 3:
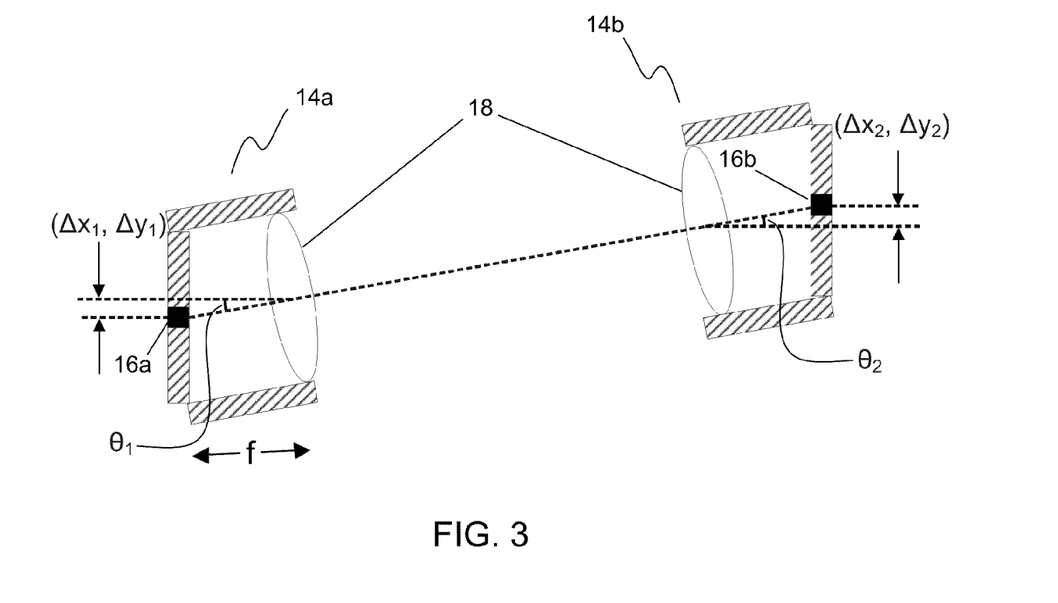
FIG. 3 is a cross-sectional view of two photonic assemblies exhibiting a mutual tilt misalignment θ.

Signal transmission is also affected when matched photonic elements are tilted relative to each other. In the example shown in FIG. 3, two photonic assemblies 14a-b are situated opposite each other with the photonic element 16a-b of each being tilted from horizontal by an angle θ. The detector assembly 14b includes a photonic element having an active area diameter. The elements are also equipped with lenses 18 so that each assembly also has a focal length f. The tolerance in such a case is linearly proportional to the active area diameter and f. The vector sum of $|\Delta x_1 - \Delta x_2|$ and $|\Delta y_1 - \Delta y_2|$ and $f*|\theta_1 - \theta_2|$ is less than about 0.5 D, or about 20 μm for a detector having D=50 μm.

Figure 4:
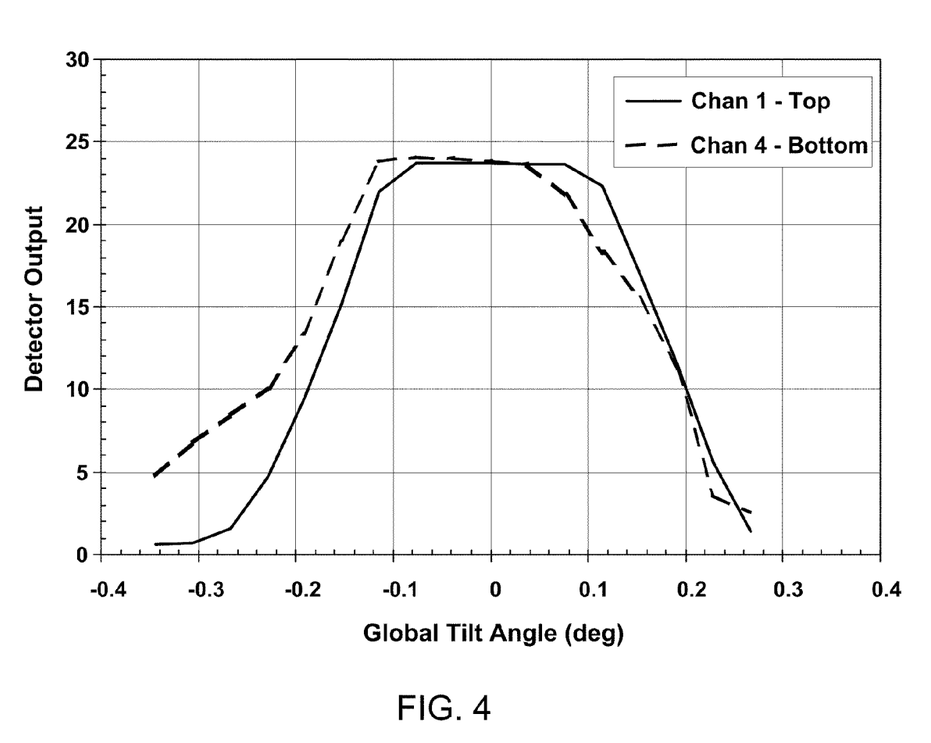
FIG. 4 is a graph of the relationship between the degree of tilt misalignment between two photonic elements and the integrity of a signal transmitted between the elements.

The graph in FIG. 4 shows the relationship between $|\theta_1 - \theta_2|$ in a 4×4 array of detectors (active diameter D=50 μm) when $\Delta x_1 - \Delta x_2$ and $\Delta y_1 - \Delta y_2$ are each close to zero. It can be seen from this graph that such connections are even more intolerant of tilt misalignment than rotational misalignment. For example, for this particular array of detectors, $|\theta_1 - \theta_2|$ should be about 0.15° or less in order to keep signal loss below about 1 dB.

It should be noted that the specific tolerances discussed herein are purely exemplary and arise at least in part from the particular geometry of the array in question. The tolerance for any given array may likewise depend on a number of other factors, including but not limited to array design, spacing between transmitter and receiver, the type of transmitting/detecting elements used, the type of signal used, and other requirements arising from the task to which the apparatus is applied.

Figure 5:
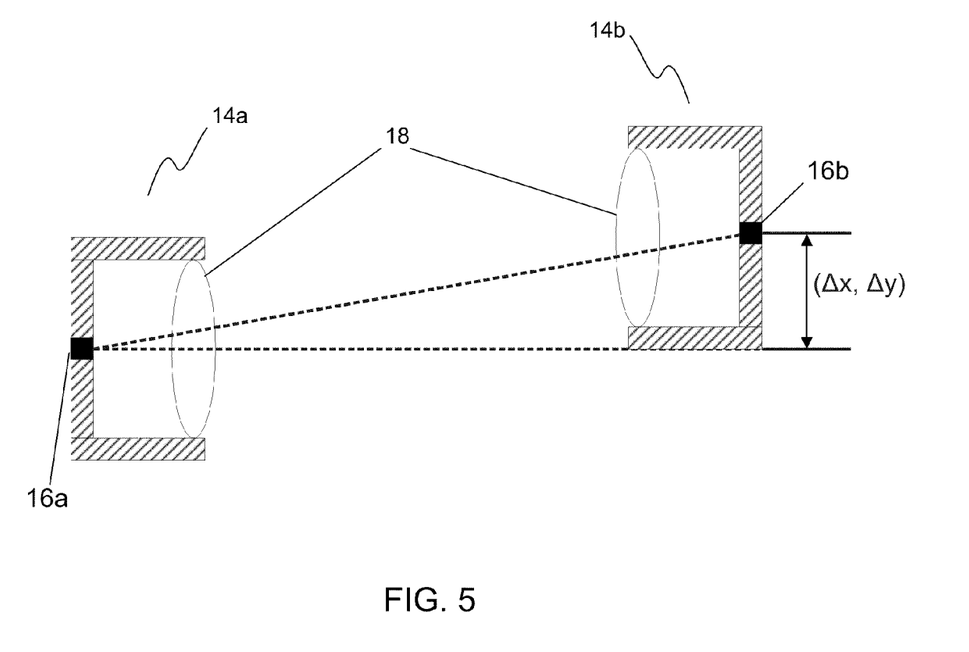
FIG. 5 is a cross-sectional view of two photonic assemblies exhibiting a shift misalignment (Δx, Δy)
Figure 6:
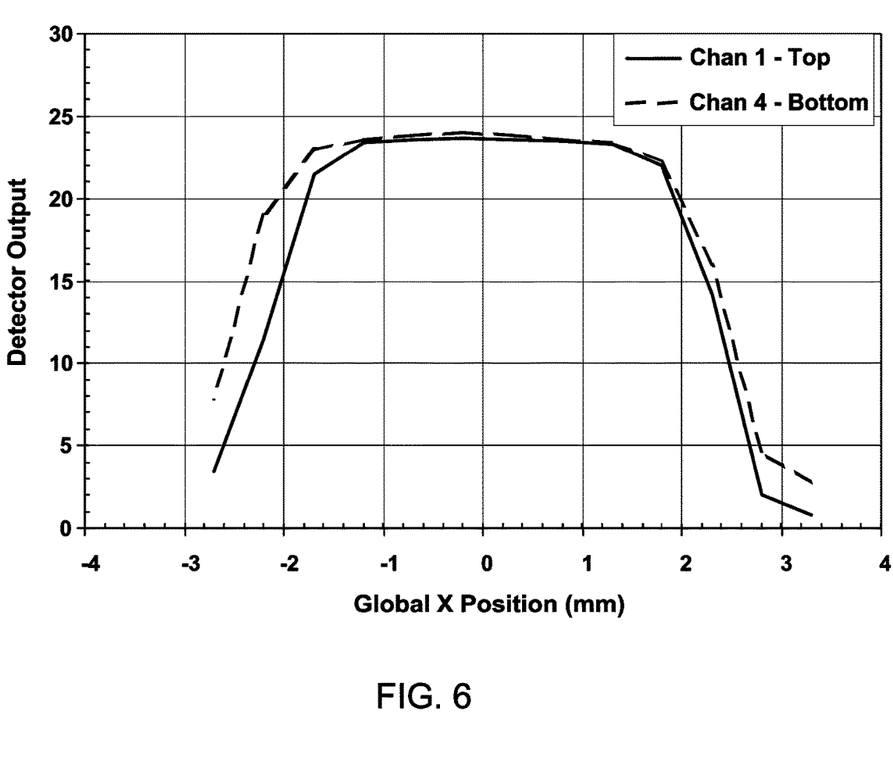
FIG. 6 is a graph of the relationship between the degree of shift misalignment between two photonic elements and the integrity of a signal transmitted between the elements.

Lateral shift misalignment is another factor in signal transmission between two photonic elements. However, it has been found that optical power loss in a telecentric system is less sensitive to this kind of misalignment than to tilt and rotation. The diagram of FIG. 5 represents two photonic assemblies 14a,b exhibiting a relative shift misalignment (Δx, Δy) along two axes (x, y). The effect of lateral shift for a 4×4 array of detectors (D=50 μm) is shown in the graph of FIG. 6. To keep signal loss to <1 dB in such an array, the vector sum of Δx and Δy can be <2 mm.

Given the low tolerance for misalignment, particularly tilt and rotation, the relative positioning of matched photonic elements is a significant issue in optical connections. This is particularly true for very small diameter detectors, as these will tend to be more sensitive to misalignment. As such, it will usually not be sufficient to rely on the alignment that may result from careful placement of blades or photonic subassemblies within a computer rack or chassis without additional constraints on position. Accordingly, it can be valuable to provide a mechanism, such as an interposer, between blades that align photonic elements and may also condition the optical transmission so as to reduce signal loss. Such an interposer mechanism between photonic assemblies can produce a relative position of the elements in which translation, tilt, and rotation are within tolerances. In addition, the interposer can act as an enclosure around the transmitter and/or receiver that protects these optical components as well as the blade assemblies to which they are attached.

Figure 7A:
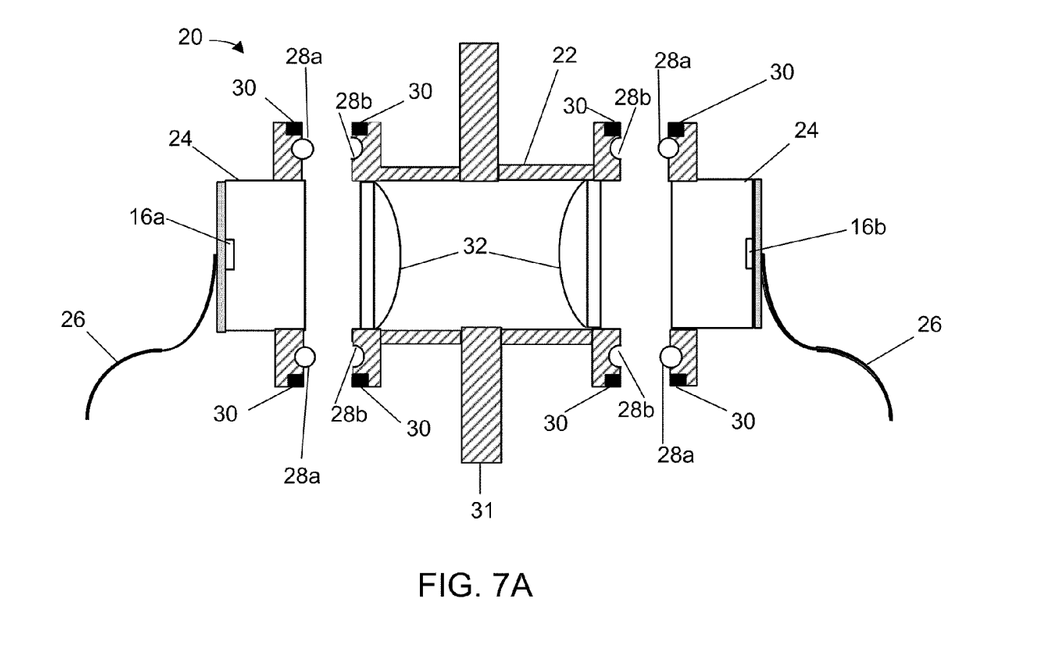
FIG. 7A is a cross-sectional view of the separated components of an optical connection that includes an optical pathway interposed between two photonic elements in accordance with an embodiment of the present invention.

FIG. 7A provides an example of an optical interposer mechanism in accordance with an embodiment of the present invention. In this embodiment, an optical connection 20 comprises a first photonic element 16a, a second photonic element 16b and an interposer 22 situated between them. The photonic elements may comprise one or more lasers or other photonic emitters as a transmitting element, and one or more corresponding light-detecting diodes as receiving elements. In a particular aspect, each photonic element may comprise an array of interdigitated transmitting and receiving elements to provide bi-directional data flow. In another aspect, the transmitting element can comprise vertical-cavity surface-emitting lasers (VCSEL). In a particular embodiment, the elements are each situated in a terminal block 24 connected to the computing unit by a cable 26. "Terminal block" refers to a structure, such as a connector or connector housing, that houses photonic elements and is involved in placing the photonic element as part of the optical connection.

The interposer 22 can serve as a common structure to which the photonic element connectors may be joined, and also as a pathway directing the photonic signal from the transmitting element to the receiving element. Accordingly, the interposer comprises an optical pathway through which the signal can pass. In addition, the interposer can serve to shield the photonic signal from interference, such as light from other sources. In a particular aspect, the interposer is hollow for a substantial portion of its length, so that the pathway consists at least partially of empty space. The interposer may also prevent dust or debris from entering the optical pathway. To establish the optical connection, the photonic elements are connected to each end of the interposer so that the photonic elements are situated opposite one another down the length of the interposer.

Connection of the photonic elements and the interposer may be facilitated by a mechanical guide assembly 28a-b configured to secure the pieces together. In one embodiment, such a guide assembly comprises interconnecting features 28a, 28b situated on the components to be joined (e.g. on a connector housing the photonic element and on an end of the interposer). In a particular aspect, the mechanical guide assembly may include a protuberance 28a such as a spherical structure, a rod, a pin, a taper, or a datum on the face of one component, and a corresponding receptacle 28b, such as a socket, depression, or hole, on the face of the other component. In another example, such elements are configured so that they interconnect when the components are in a particular orientation and alignment relative to one another. The result is a stable joint between the components in which the components are forced into a specific orientation relative to each other. Joint stability may be increased by including a joining force mechanism to provide a force that brings the components together. In one embodiment, a magnet 30 in one or both components provides such a force. Other possible joining force mechanisms include springs, clips, and latches, as well as features commonly used in mated connectors such as angled ramps, and detents. In particular embodiments, at least one of the components is mounted on a flexible mechanism such as a spring. Possible spring types include but are not limited to coiled springs, leaf springs, and air springs. A flexible mounting mechanism can also promote alignment by imparting freedom of movement to the components. The flexible mechanism may be flexible in all axes of motion and may allow the component to move along the X, Y, and Z axes as well as rotate around those axes.

In the embodiment exemplified by the device of FIG. 7A, the photonic elements can be joined to each end of the interposer, with the mechanical guide assembly forcing a particular mutual orientation among the components. More particularly, the components are joined so that the relative tilt and rotation of the photonic elements may be reduced. This allows for a more reliable and repeatable high-integrity optical connection of two blades, where said connection is achievable by inserting the blades so that their respective connectors interlock with the interposer.

The devices described herein can provide secure optical connections between computing units in a larger computing system, e.g. two adjacent blades installed in the chassis of a server. The present invention can be adapted to accommodate structural features associated with blades, such as metal blade enclosures, and also features of the chassis such as partitions. In a particular aspect, the interposer may be mounted on a partition 31 situated between adjacent blades. In this arrangement, the interposer penetrates the partition and provides a pathway for a photonic signal to move from one blade to another. In an alternate arrangement, the interposer may be permanently attached to the optical connector of one blade. In this case each connected pair of blades consists of one blade with an attached interposer and a blade lacking an interposer.

Figure 7B:
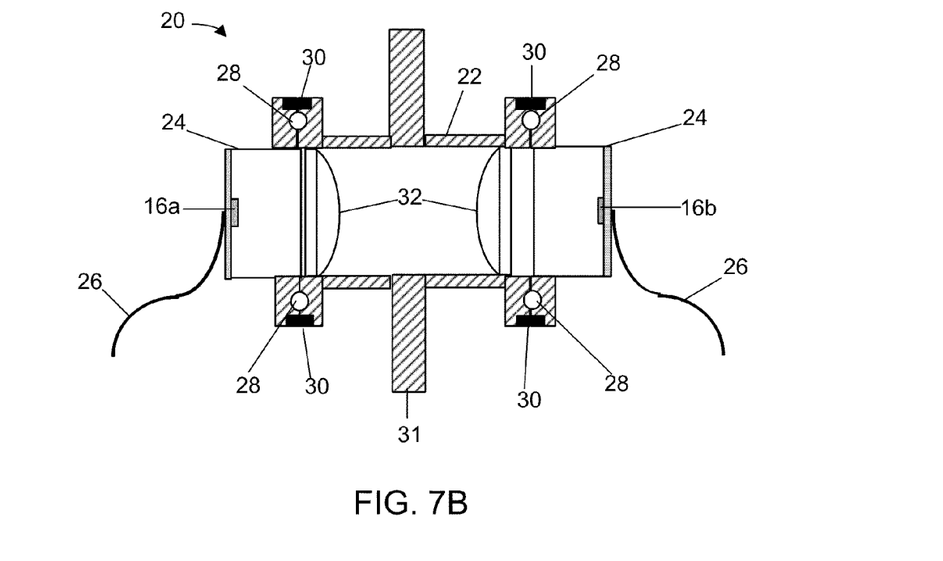
FIG. 7B is a cross-sectional view of the optical connection of FIG. 7A in the assembled state.

FIG. 7B shows the components joined to form a completed connection. The interposer can also include one or more optics assemblies 32 that direct the photonic signal from the transmitting element, down the pathway provided by the interposer, and onto the receiving element. In one embodiment, the optics include telecentric optics. As discussed above, telecentric optics can impart reduced sensitivity to lateral shift misalignments. Therefore, including such optics assemblies serves the further function of effectively providing an additional alignment mechanism. This can combine with the effects of a mechanical guide assembly to condition optical transmission so as to reduce loss of signal power.

Figure 8A:
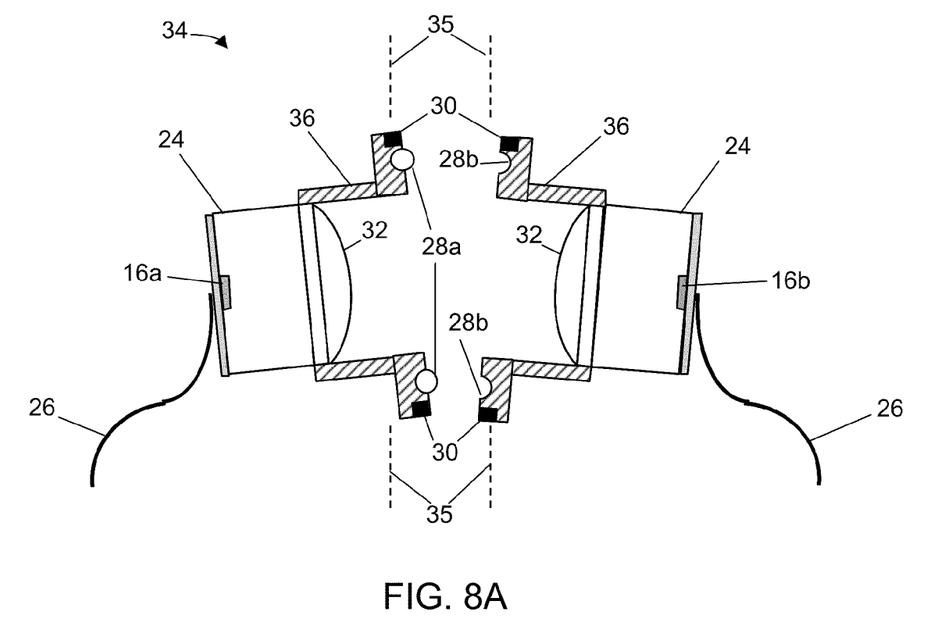
FIG. 8A is a cross-sectional view of the separated components of an optical connection in which two separate optical pathway elements are configured to join two photonic elements in accordance with an embodiment of the present invention.
Figure 8B:
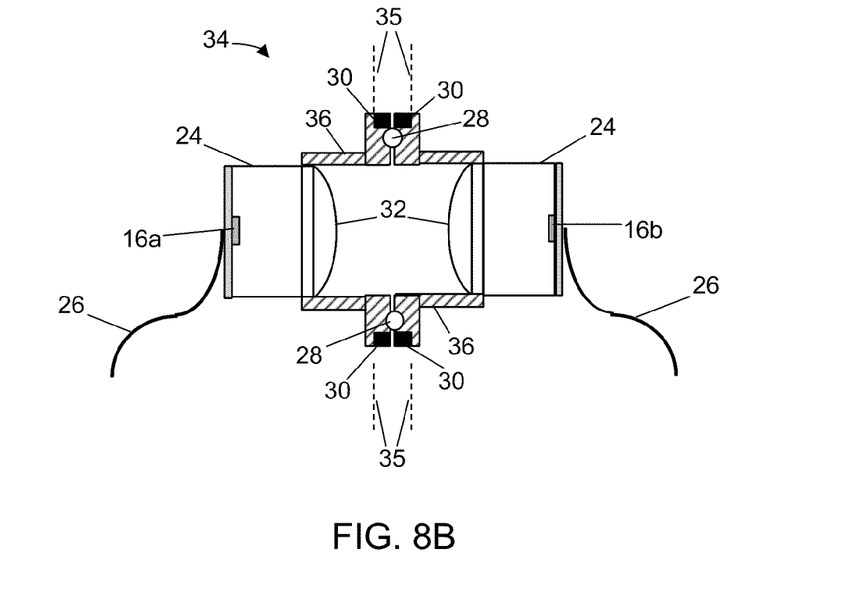
FIG. 8B is a cross-sectional view of the optical connection of FIG. 8A in the assembled state.

According to another embodiment, each terminal block includes structures that form an interposer when the connectors are joined. An optical connection 34 in accordance with this embodiment is shown in FIGS. 8A and 8B in separated and joined depictions, respectively. The connection joins two blades each of which is housed in a separate enclosure 35. In this embodiment, each terminal block 24 includes an optical pathway element 36 comprising a hollow extension that forms an optical pathway between the terminal blocks when joined with a matching extension on the other terminal block. This embodiment can also include a mechanical guide assembly 28a-b such as described above. In one particular embodiment, the mechanical guide assembly comprises features on each connector that match and interconnect with features on the other connector. In one aspect, these features are on the distal face of each connector's optical pathway element. Mechanisms for providing a joining force, such as a magnet 30, may also be included. When the terminal blocks are brought together or in sufficient proximity to each other, the mechanical guide features interconnect, bringing the photonic elements into a fixed particular mutual orientation. This interconnection also establishes an optical pathway between the photonic elements. This embodiment can also comprise one or more optics assemblies 32 to direct the photonic signal through the pathway. In this case, an optics assembly is situated in the optical pathway element of one or both connectors. In the case of more than one optics assembly, the assemblies may function as a unit when the connectors are joined. In a particular embodiment, the optics assemblies include telecentric optics.

Figure 9A:
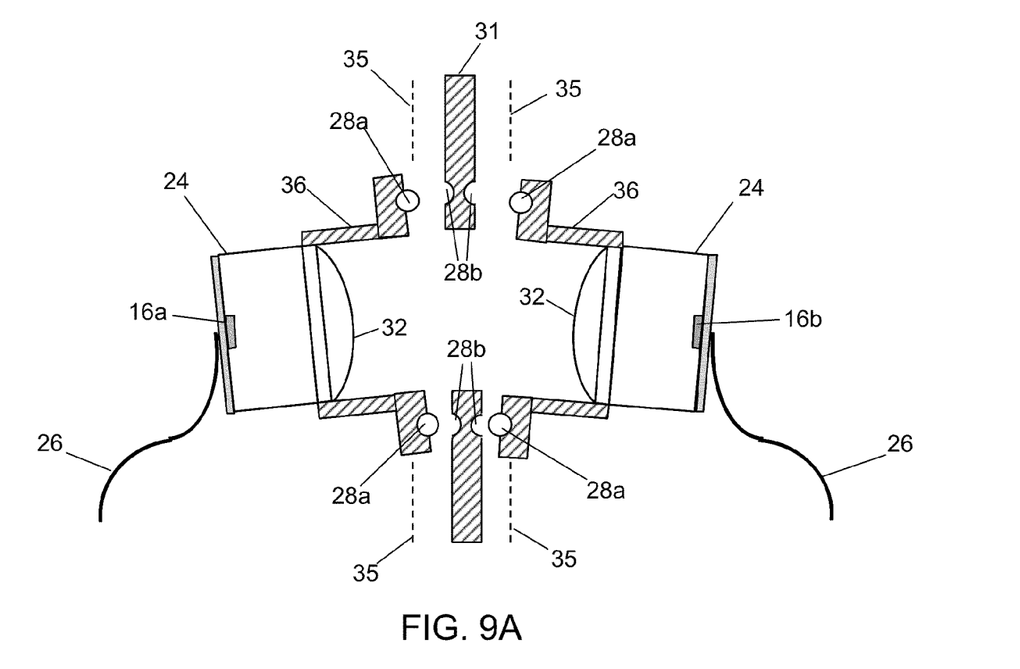
FIG. 9A is a cross-sectional view of the separated components of an optical connection as in FIGS. 8A and 8B, further including a partition.
Figure 9B:
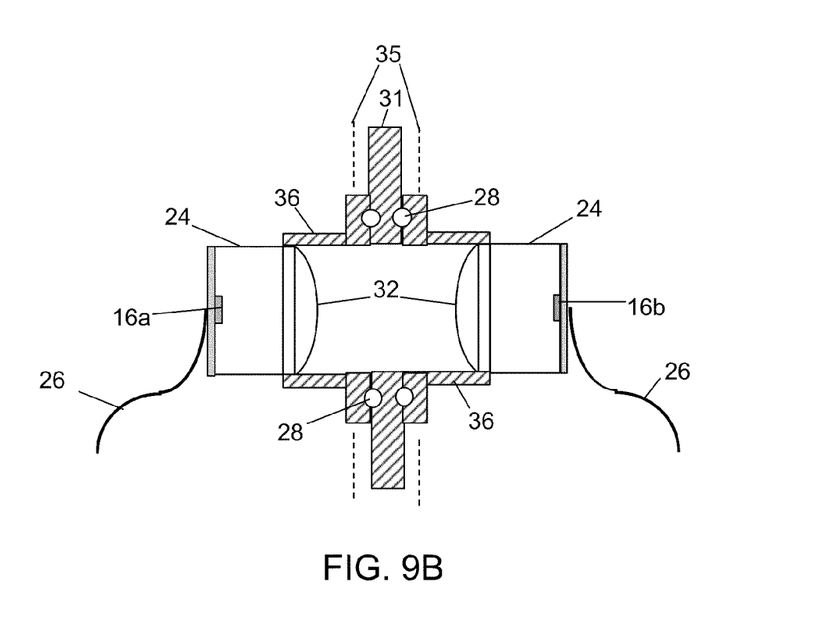
FIG. 9B is a cross-sectional view of the optical connection of FIG. 9A in the assembled state.

As discussed above, a partition between blades may actually house the interposer. A partition can also be incorporated into optical connections of the present invention in other ways. In certain embodiments, attachment and proper orientation of the terminal blocks may be accomplished by interfacing with the partition. This arrangement is depicted in FIG. 9A and as an assembled connection in 9B. In this embodiment, the partition 31 includes mechanical guide features 28a,b that correspond to features on the optical pathway elements 36.

The terminal block for each blade can be interfaced with the blade's enclosure 35 so as to allow the terminal block to contact a mated connector or interposer. In one embodiment, the terminal block may be mounted to the exterior of the enclosure. In another embodiment, the terminal block may be embedded within an opening of appropriate size and shape in the wall of the enclosure. In a particular aspect of either arrangement, the terminal block may be mounted in such a way that it is free to move to some extent along each of three axes. In this way, during installation and connection of the blade, the terminal block can shift as needed to align it relative to another component so that their mechanical guide features will engage and interconnect. This can be achieved by mounting the terminal block on a flexible support such as a leaf spring or by suspending the terminal block in a flexible housing such as a gasket. Such flexible mounts can also serve the function of supplying a joining force as described above.

Figure 10:
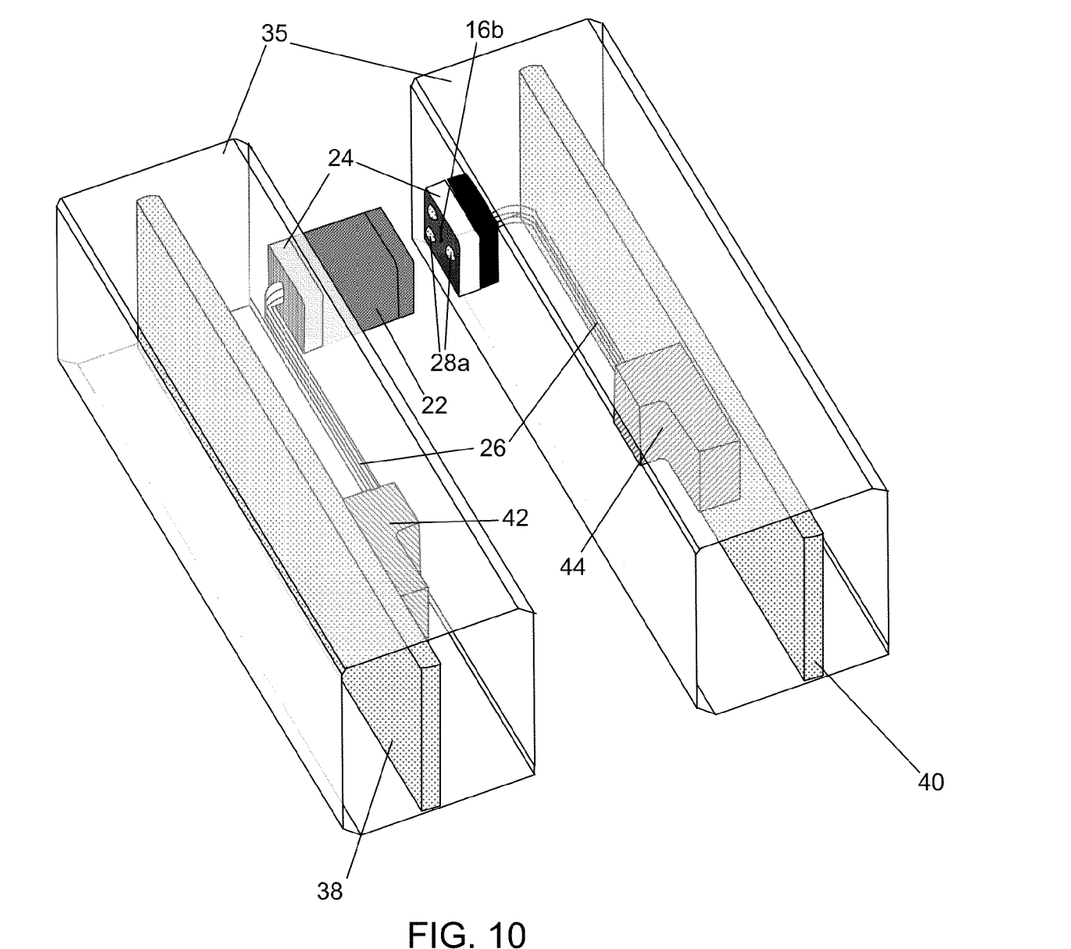
FIG. 10 is a perspective view of two separately enclosed blades positioned for connection through an optical pathway interposed between them according to an embodiment of the present invention.

A localized high bandwidth data pipe can be established precisely where it is needed between two adjacent computer blades. The connection can be made without routing the connection through a backplane. Such a connection of two adjacent computing units is shown in FIG. 10, where a first blade 38 and a second blade 40 are each housed in a separate enclosure 35. Each blade includes an opto-electric transmitter 42 or receiver 44 to which a photonic element 16, located in a terminal block 24, is connected through a fiber cable 26. In the embodiment shown, the interposer 22 is press-fit into or even permanently attached to the terminal block of the first blade. The interposer protrudes through the side of the enclosure in a position that allows the interposer to interface with the terminal block of the second blade. Mechanical guide features 28a provide connection with proper alignment by interconnecting with corresponding features (not visible due to perspective) on the interposer. This configuration overcomes the difficulty of establishing an optical link between two blades where it may be less desirable to use standard optical connectors that plug in along a direction that is coaxial with the optical fiber. The embodiment shown in FIG. 10 illustrates a connection between blades in a side-to-side orientation. However, a connection in accordance with the present invention may be used to connect blades in a top-to-bottom or front-to-back arrangement as well.

Summarizing and reiterating to some extent, a connection has been provided which allows two photonic elements to be aligned so as to provide a higher-integrity optical interconnection between two computing units. The connection can include an interposer and mechanical features that produce a particular alignment between the photonic elements. The connection can also include optical elements, such as a telecentric lens arrangement, to make the optical connection less sensitive to certain types of misalignment. This connector may be particularly useful in connecting adjacent PCBs in a server.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for optically coupling photonic elements, comprising:
   an interposer having two ends and including an optical pathway disposed within the interposer, wherein the optical pathway is substantially linear;
   a first photonic element situated adjacent to an end of the optical pathway and axially aligned with the optical pathway;
   a second photonic element situated adjacent to another end of the optical pathway and axially aligned with the optical pathway;
   an optics assembly to direct a photonic signal along the optical pathway; and
   at least one mechanical guide assembly located at each end of the optical pathway, wherein the at least one mechanical guide assembly comprises a plurality of protuberances and corresponding sockets that cooperate to prevent relative rotation and tilt between the first and second photonic elements and the interposer.

2. The device of claim 1, wherein the optics assembly includes telecentric optics.

3. The device of claim 1, wherein the at least one mechanical guide assembly includes a joining force mechanism to bias the plurality of protuberances into the corresponding sockets.

4. A device for optically coupling photonic elements, comprising:
   a first connector comprising:
      a first terminal block;
      a first optical pathway element comprising a hollow sleeve extending from the first terminal block;
      a first photonic element situated between the first terminal block and the first optical pathway element, and axially aligned with respect to the first optical pathway element; and
      a first optics assembly situated within the first optical pathway element;
   a second connector situated opposite the first connector, and comprising:
      a second terminal block having a second photonic element;
      a second optical pathway element comprising a hollow sleeve extending from the second terminal block;
      the second photonic element situated between the second terminal block and the second optical pathway element, and axially aligned with respect to the second optical pathway element; and
      a second optics assembly situated within the second optical pathway element; and
   a mechanical guide assembly for securing the first optical pathway element in a position relative to the second optical pathway element, wherein the mechanical guide assembly comprises a plurality of protuberances on the first optical pathway element and corresponding sockets on the second optical pathway element that cooperate to prevent relative rotation and tilt between the first and second terminal blocks.

5. The device of claim 4, wherein at least one optics assembly includes telecentric optics.

6. The device of claim 4, wherein the mechanical guide assembly includes a joining force mechanism to bias the plurality of protuberances into the corresponding sockets.

7. The device of claim 4, wherein the mechanical guide assembly is located in part on a partition situated between the first connector and second connector.

8. The device of claim 4, wherein the first connector and second connector are movable relative to each other when unjoined.

9. A connection for optically coupling computing units, comprising:
   a first photonic element coupled to a first computing unit;
   a second photonic element coupled to a second computing unit, and situated opposite the first photonic element;
   a partition situated between the first computing unit and the second computing unit;
   an interposer mounted on the partition, and including an optical pathway situated between the first photonic element and the second photonic element, wherein the optical pathway penetrates the partition and the optical pathway is substantially linear;
   an optics assembly to direct a signal from the first photonic element through the optical pathway to the second photonic element; and
   a mechanical guide assembly to connect the first photonic element and the second photonic element to the interposer, wherein the mechanical guide assembly comprises a plurality of protuberances and corresponding sockets that cooperate to prevent relative rotation and tilt between the first and second photonic elements and the interposer.

10. The connection of claim 9, wherein the mechanical guide assembly includes a joining force mechanism to bias the plurality of protuberances into the corresponding sockets.

11. The connection of claim 9, wherein the first computing unit and the second computing unit are each situated substantially inside an enclosure.

12. The connection of claim 11, wherein the photonic element coupled to each computing unit is movably mounted in an aperture in a wall of the enclosure in which the computing unit is situated.

13. The device of claim 1, wherein the corresponding sockets are smooth.

14. The device of claim 3, wherein the at least one mechanical guide assembly comprises a set of magnets that apply a magnetic force to bias the plurality of protuberances into the corresponding sockets.

15. The device of claim 3, wherein the at least one mechanical guide assembly comprises a spring that applies a spring biasing force to bias the plurality of protuberances into the corresponding sockets.

16. The device of claim 1, wherein each of the sockets of the at least one mechanical guide assembly are shaped to mate with a corresponding one of the plurality of protuberances.

17. The device of claim 4, wherein each of the sockets of the mechanical guide assembly are shaped to mate with a corresponding one of the plurality of protuberances.

18. The connection of claim 9, wherein each of the sockets of the mechanical guide assembly are shaped to mate with a corresponding one of the plurality of protuberances.

* * * * *